United States Patent [19]

Georgi

[11] 4,027,429
[45] June 7, 1977

[54] PLASTIC STARTER POT

[76] Inventor: Walter L. Georgi, 427 E. Judd St., Woodstock, Ill. 60098

[22] Filed: Mar. 11, 1976

[21] Appl. No.: 666,008

[52] U.S. Cl. .................................... 47/73; 47/79
[51] Int. Cl.² .................................... A01G 9/10
[58] Field of Search ............... 47/34 R, 34 A, 34 D, 47/37, 38, 38.1, 34 S, 34.11, 34.13

[56] References Cited

UNITED STATES PATENTS

| 357,698 | 2/1887 | Burrough | 47/37 X |
| 1,376,117 | 4/1921 | Sandor | 47/38 X |
| 2,238,132 | 4/1941 | Ritter | 47/38 |
| 3,328,913 | 7/1967 | Vogt | 47/34 R |

FOREIGN PATENTS OR APPLICATIONS

| 243,257 | 4/1960 | Australia | 47/34 R |
| 815,709 | 7/1937 | France | 47/38.1 |
| 547,677 | 4/1932 | Germany | 47/37 |
| 681,968 | 2/1965 | Italy | 47/34 A |
| 103,027 | 1/1917 | United Kingdom | 47/34 A |
| 1,312,398 | 4/1973 | United Kingdom | 47/37 |
| 403,176 | 12/1933 | United Kingdom | 47/34 R |

Primary Examiner—Edgar S. Burr
Assistant Examiner—Steven A. Bratlie
Attorney, Agent, or Firm—Leydig, Voit, Osann, Mayer & Holt, Ltd.

[57] ABSTRACT

A starter pot for plants has an aperture in the bottom wall. The aperture is spaced from the side walls of the pots and has an upturned lip around the periphery thereof so as to form an annular water reservoir space at the bottom of the pot and concealed from exterior view. A disc is enclosed within the pot and rests on the upturned lip to support soil in the pot and to prevent the soil from entering the water reservoir space. The disc has several notches formed in its periphery to permit water to drain from the soil into the water reservoir space. A continuous annular rim depends from the disc in overlapping engagement with at least a portion of the upturned lip to block the escape of water frm the reservoir space through the bottom of the pot. The disc is detached from the pot so that the disc can be pushed upwardly through the pot to remove a rooted plant therefrom without disturbing the root system of the plant.

5 Claims, 3 Drawing Figures

U.S. Patent   June 7, 1977   4,027,429
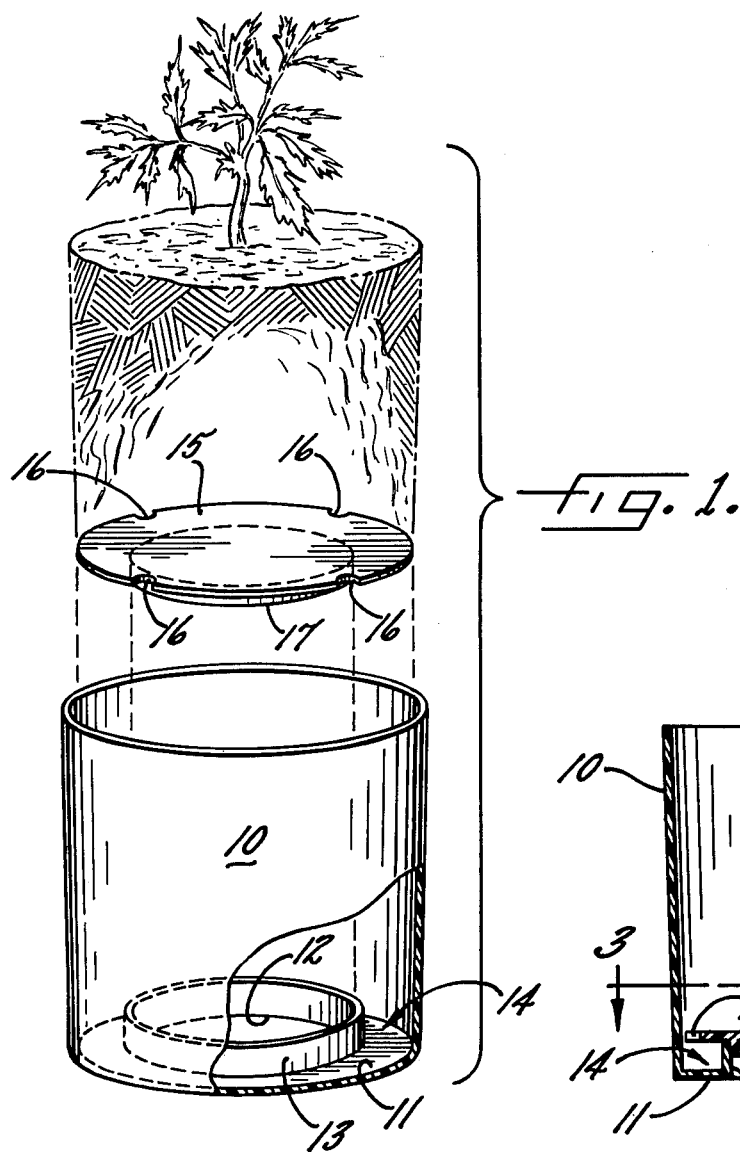
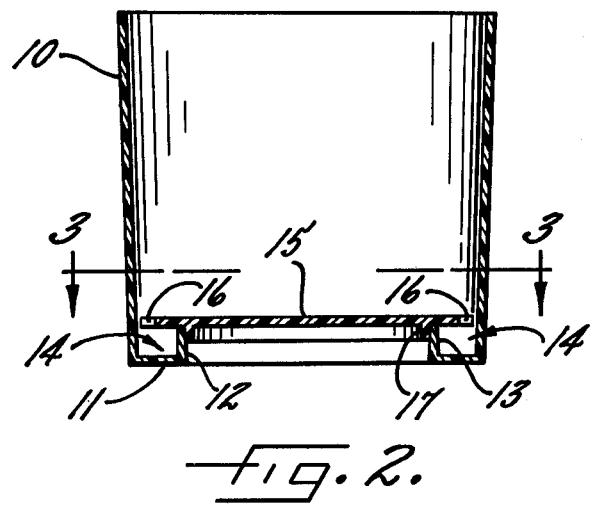
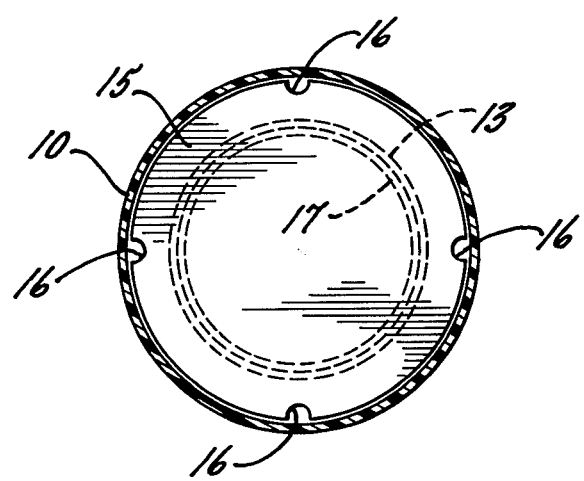

PLASTIC STARTER POT

DESCRIPTION OF THE INVENTION

The present invention relates generally to starter pots for plants and, more particularly, to a starter pot that has certain improved structural features and yet can be efficiently manufactured at a relatively low cost by injection molding.

It is a principal object of the present invention to provide an improved starter pot which facilitates removal of a rotted plant and the soil in which it is rooted without disturbing the root system.

It is another object of the invention to provide an improved starter pot of the foregoing type which permits excess water to drain from the bottom of the potted soil into a liquid reservoir that is concealed from exterior view. In this connection, a related object of the invention is to provide such an improved starter pot which inhibits leakage of excess water from the pot even when the excess is greater than the capacity of the liquid reservoir.

A further object of the invention is to provide an improved starter pot of the type described above which permits the excess water in the liquid reservoir to be re-captured by the potted soil as it dries.

Yet another object of the invention is to provide such an improved starter pot which can be efficiently manufactured by injection molding.

Other objects and advantages of the invention will be apparent from the following detailed description and the accompanying drawings, in which:

FIG. 1 is an exploded perspective view, partially in section, of a starter pot embodying the invention, and also illustrating a plant rooted in a plug of potted soil;

FIG. 2 is a vertical section taken through the center of the pot illustrated in FIG. 1 with the two parts thereof in their assembled positions; and FIG. 3 is a section taken substantially along the line 3—3 in FIG. 2.

While the invention will be described in connection with a certain preferred embodiment, it will be understood that it is not intended to limit the invention to that particular embodiment. On the contrary, it is intended to cover all alternatives, modifications and equivalents as may be included within the spirit and scope of the invention as defined by the appended claims.

Turning now to the drawings, there is illustrated a starter pot which includes a cylindrical shell 10 forming the side walls of the pot and a bottom wall 11 formed as an integral part of the side walls. A relatively large aperture 12 is formed in the bottom wall 11 so that the bottom wall 11 is actually in the form of an inturned flange at the lower end of the cylindrical shell 10. While the pot has been illustrated as having a straight, untapered cylindrical configuration, it will be understood that the invention is equally applicable to pots of many other possible cross-sectional configurations, including tapered cylinders, polygons, etc.

In accordance with one important aspect of the present invention, an upturned lip is formed around the periphery of the aperture in the bottom wall of the pot so as to form an annular water reservoir space at the bottom of the pot and concealed from exterior view, and this water reservoir space is covered by a floating bottom member which extends across substantially the entire bottom of the pot to support soil within the pot and to prevent soil from entering the water reservoir space. Thus, in the illustrative embodiment, an upturned lip 13 is formed as an integral part of the bottom wall 11 and extends continuously around the entire periphery of the aperture 12 so as to form an annular water reservoir space 14 around the periphery of the bottom of the pot. The major portion of the water reservoir space 14 is covered by a disc 15 which rests on the top edge of the lip 13. To permit water to drain into the reservoir space 14 from soil within the pot, a small clearance is provided between the outer periphery of the disc 15 and the inside walls of the cylindrical shell 10, and a plurality of notches 16 are also formed at spaced intervals around the periphery of the disc 15. It will be understood that these notches 16, as well as the clearance between the outer periphery of the disc 15 and the inside walls of the cylindrical shell 10, are sufficiently small that they do not permit any significant amount of soil to enter the water reservoir space 14.

Thus, whenever the soil and/or plant within the pot is watered, excess water can drain downwardly into the reservoir space 14. The water then remains in this reservoir concealed from exterior view but available to be evaporated back into the soil as it dries.

To inhibit the leakage of excess water through the bottom of the pot, e.g., when the reservoir space 14 becomes filled, a continuous annular rim 17 depends from the disc 15 in overlapping engagement with the lip 13 to block the escape of water from the reservoir space 14. The depending rim 17 may be formed as an integral part of the disc 15, e.g., by plastic molding, and is positioned to snugly engage the vertical surface of the lip 13 when the disc 15 is pressed down against the top edge of the lip 13. Although the rim 17 is illustrated as engaging the radially inner surface of the lip 13, it will be understood that the rim 17 could be located to engage the radially outer surface of the lip 13 to provide the same sealing effect.

When it is desired to remove a rooted plant from the pot, the disc 15 is pushed upwardly through the cylindrical shell 10 to telescope the plant and the plug of soil in which it is rooted out of the pot without distrubing the soil or the root system of the plant. Consequently, the process of removing the plant from the pot subjects the plant and its root system to very little "shock" effect. Since the top of the disc 15 is a smooth plastic surface, the soil plug containing the rooted plant can be easily removed therefrom after it has cleared the top edge of the cylindrical shell 10. Of course, the larger aperture 12 in the bottom wall of the pot provides convenient access to the lower surface of the disc 15, so that it can be easily pushed upwardly through the pot.

As can be seen from the foregoing detailed description, the improved starter pot provided by this invention facilitates removal of a rooted plant and the soil in which it is rooted without disturbing the fragile root system of a young plant. The structure of the pot also permits excess water to drain from the bottom of the potted soil into the liquid reservoir that is concealed from the exterior of the pot to provide an aesthetically pleasing appearance. The overlapping engagement of the upturned lip 13 and the depending flange 17 inhibit leakage of excess water from the pot even when the excess is greater than the capacity of the liquid reservoir 14. Furthermore, the entire pot assembly can be efficiently manufactured by injection molding only two separate parts, so that it can be mass produced on a an economic basis.

I claim as my invention:

1. A starter pot for plants comprising the combination of a pot having an aperture in the bottom wall, said aperture being spaced from the side walls of the pot and having an upturned lip around the periphery of the aperture so as to form an annular water reservoir space at the bottom of the pot, means to prevent water from passing through said aperture comprising bottom member covering said aperture and said reservoir space and detachable from the pot so that said bottom member can be pushed upwardly through the pot to remove a rooted plant therefrom without disturbing the soil in which the plant is rooted, said bottom member having at least one drain port to permit water to drain from the soil into said reservoir space, and a continuous annular rim depending from said bottom member for fluid tight interfitting engagement with said upturned lip around the entire periphery thereof to block the escape of water from said reservoir space through the aperture in the bottom of the pot.

2. A starter pot as set forth in claim 1 wherein the depending rim on said bottom member engages the inner surface of the lip on said bottom wall.

3. A starter pot as set forth in claim 1 wherein said bottom member has a plurality of notches formed in the periphery thereof to provide a plurality of drain ports for draining water from the soil into said reservoir space.

4. A starter pot as set forth in claim 1 wherein the pot is cylindrical in shape and said bottom member is a disc with a diameter slightly smaller than the minimum inside diameter of the pot.

5. A starter pot for plants comprising the combination of a pot having an aperture in the bottom wall thereof, said aperture being spaced from the side walls of the pot and having an upturned lip around the periphery of the aperture so as to form an annular water reservoir space at the bottom of the pot and concealed from exterior view, means to prevent water from passing through said aperture comprising a disc disposed within the pot covering said reservoir space to support soil within the pot and to prevent the soil from entering said water reservoir space, said disc having at least one drain opening to permit water to drain from the soil into said water reservoir space, said disc being detachable from the pot so that the disc can be pushed upwardly through the pot to remove a rooted plant therefrom without disturbing the root system of the plant, and a continuous annular rim depending from said disc for fluid tight interfitting engagement with said upturned lip around the entire periphery thereof to block the escape of water from said reservoir space through the aperture in the bottom of the pot.

* * * * *